United States Patent
Klaedtke (10) Patent No.: US 10,757,140 B2
(45) Date of Patent: Aug. 25, 2020

(54) MONITORING EVENT STREAMS IN PARALLEL THROUGH DATA SLICING

(71) Applicant: NEC Laboratories Europe GmbH, Heidelberg (DE)

(72) Inventor: Felix Klaedtke, Heidelberg (DE)

(73) Assignee: NEC CORPORATION, Tokyo (JP)

(*) Notice: Subject to any disclaimer, the term of this patent is extended or adjusted under 35 U.S.C. 154(b) by 225 days.

(21) Appl. No.: 16/116,930

(22) Filed: Aug. 30, 2018

(65) Prior Publication Data
US 2020/0076852 A1   Mar. 5, 2020

(51) Int. Cl.
*H04L 29/06* (2006.01)
*G06F 9/54* (2006.01)

(52) U.S. Cl.
CPC .............. *H04L 63/20* (2013.01); *G06F 9/542* (2013.01); *H04L 63/1425* (2013.01)

(58) Field of Classification Search
CPC ........................... H04L 63/1416; H04L 63/20
See application file for complete search history.

(56) References Cited

U.S. PATENT DOCUMENTS

| | | | | |
|---|---|---|---|---|
| 6,633,835 B1* | 10/2003 | Moran | ................... | H04L 47/10 |
| | | | | 702/181 |
| 8,719,796 B2* | 5/2014 | Rosu | ..................... | G06F 11/302 |
| | | | | 717/128 |
| 9,244,978 B2 | 1/2016 | Alves et al. | | |
| 9,805,101 B2 | 10/2017 | Singh et al. | | |
| 10,135,862 B1* | 11/2018 | McClintock | .......... | G06F 21/554 |
| 10,601,872 B1* | 3/2020 | Natarajan | .......... | H04W 12/0027 |
| 2012/0054363 A1* | 3/2012 | Hart | ........................ | H04L 12/66 |
| | | | | 709/232 |
| 2013/0067572 A1* | 3/2013 | Muramoto | .......... | H04L 63/1408 |
| | | | | 726/22 |
| 2016/0099963 A1* | 4/2016 | Mahaffey | ............ | H04L 63/0227 |
| | | | | 726/25 |
| 2018/0307842 A1* | 10/2018 | Kuroda | .................. | G06F 21/577 |
| 2020/0076852 A1* | 3/2020 | Klaedtke | ............. | H04L 63/1425 |

OTHER PUBLICATIONS

David Basin, et al., "Runtime Verification of Temporal Properties over Out-of-order Data Streams", International Conference on Computer Aided Verification, Jul. 13, 2017, pp. 356-376.
David Basin, et al., "Monitoring Metric First-Order Temporal Properties", Journal of the ACM, vol. 62, No. 2, article 15, Apr. 2015, pp. 1-45.
Grigore Rosu, et al., "Semantics and Algorithms for Parametric Monitoring", Logical Methods in Computer Science, vol. 8 (1:09), Feb. 23, 2012, pp. 1-47.
David Basin, et al., "Scalable Offline Monitoring of Temporal Specifications", Formal Methods in System Design, vol. 49, issue 1-2, Oct. 2016, pp. 75-108.

* cited by examiner

*Primary Examiner* — Sher A Khan
(74) *Attorney, Agent, or Firm* — Leydig, Voit & Mayer, Ltd.

(57) ABSTRACT

A method for checking policy compliance of events of an event stream includes receiving the events; grouping a plurality of the received events into a plurality of slices based upon a policy specification and an event classification; determining whether a policy violation has occurred by concurrently evaluating at least two of the slices according to the policy specification; and in a case in which the policy violation is determined, reporting the policy violation.

12 Claims, 6 Drawing Sheets

MONITORING EVENT STREAMS IN PARALLEL THROUGH DATA SLICING

FIELD

The present invention relates to a method and system for determining incorrect behavior of components in an information technology (IT) system.

BACKGROUND

Data owners, such as individuals and companies, are increasingly concerned that their private data, collected and shared by IT systems, is used only for the purposes for which it was collected. Additionally, entities collecting and managing this data must increasingly comply with regulations on how data is accessed and processed. Accordingly, there is a need to monitor IT systems to ensure that the data is being used correctly, and to identify and rectify incorrect behavior within an IT system.

Security information and event management (SIEM) tools provide a framework for collecting events from various components of an IT system and analyzing them to identify incorrect behavior. SIEM tools use data bases (DBs), data stream management systems (DSMSs), or other stream processing engines to analyze these streams of logged system events either online or offline, where they correlate events from different system components.

The inventors have recognized, however, that conventional SIEM tools are unable to efficiently monitor and identify incorrect behavior in many systems, particular systems where many thousands to millions of events occur each second.

SUMMARY

An embodiment of the present invention provides a method for checking policy compliance of events of an event stream. The method includes receiving the events; grouping a plurality of the received events into at a plurality of slices based upon a policy specification and an event classification; determining whether a policy violation has occurred by concurrently evaluating at least two of the slices according to the policy specification; and in a case in which the policy violation is determined, reporting the policy violation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A problem unique to computer systems and solved by embodiments of the present invention is how to efficiently analyze logged events in a manner that is scalable, e.g., scalable to effectively to handle several thousand to several millions of events per second (or more). Furthermore, the analysis of events is often required to be performed in real-time, that is, the events should be processed at the rate they are generated. This is an ever growing problem in computer systems (including networked systems) that are increasingly growing by adding more and more system components. Each additional system component can generate events that should be analyzed to determine whether the system components and the overall system is performing correctly (e.g., within policy constraints). Thus, embodiments of the invention provide mechanisms for distributing and parallelizing the analysis of a stream of events for determining whether system components or an overall network of system components are performing correctly.

Embodiments of the invention identify components of an IT system that wrongly interact with each other, detect maliciously behaving components, and/or report noncompliant behavior in general. When incorrect behavior is detected, embodiments enable the system to take appropriate countermeasures. Countermeasures include, for instance, restarting, terminating, or quarantining a non-compliant system component.

While embodiments of the invention are discussed herein with reference to SIEM and SIEM tools, embodiments provide benefits beyond incorporation in SIEM tools for correlating system events and identifying incorrect behavior. For example, embodiments of the invention can be used in complex event processing (CEP) and for verifying at runtime or for debugging components of a distributed system and their interactions.

In an embodiment, the invention provides a method for checking policy compliance of an event stream by monitoring multiple substreams in parallel. To accomplish this, embodiments include a slicing operation that splits the given event stream into multiple substreams, called slices herein. The resulting slices of the event stream are then analyzed individually and in parallel for policy compliance. The analysis of the slices can be performed either online or offline, and can be performed on different computation nodes in the system. The splitting of the event stream is property preserving and accomplished by inspecting events within the event stream and grouping the events with respect to data values associated with the events.

In an embodiment, a method is provided for checking policy compliance of events of an event stream, which includes receiving the events; grouping a plurality of the received events into a plurality of slices based upon a policy specification and an event classification; determining whether a policy violation has occurred by concurrently evaluating at least two of the slices according to the policy specification; and in a case in which the policy violation is determined, reporting the policy violation.

In an embodiment, the grouping includes transforming the event classification, including data values with the received events, determined by constraints extracted from the policy specification and guard requirements on correlations between the received events.

An embodiment may further provide for the policy specification to be guarded and closed. In this embodiment, each variable in the policy specification may be bound only once by a freeze quantifier of the policy specification. Alternatively or additionally, the policy specification may include one or more policies that are specified as real-time logic MTL extended with a freeze quantifier.

An embodiment may further provide that the event classification includes a set of event classifications based on event types and event values.

An embodiment may further provide that a size of the slices is configurable according to an adjustable parameter.

An embodiment may further include predetermining a set of groupings based on the policy specification and the event classification, the set of groupings identifying the groups used when grouping each of the received events. In this embodiment, the set of groupings may be configured to be policy preserving. Alternatively or additionally, the set of groupings may be predetermined based upon transforming the event classification with respect to guards of the policy specification.

An embodiment may further include initiating a counter-measure for at least one component, which is associated with an event of the event stream and is determined to have contributed to the reported policy violation. Here, the counter-measure includes at least one of restarting, terminating, or quarantining the at least one component.

An embodiment may further include determining not to group an event of the event stream based upon the event being irrelevant to the policy specification.

In another embodiment, a log analyzer is provided for determining incorrect behavior of components in an information technology system. The log analyzer includes one or more processors, which alone or together, are configured to provide for execution of the following operations: receiving a plurality of events from the components; grouping each of the received events into at least one slice of a plurality of slices according to a policy specification and an event classification; determining whether a policy violation has occurred by concurrently evaluating at least two of the slices according to the policy specification; and in a case in which the policy violation is determined, reporting the policy violation.

An embodiment may further provide a log analyzer where the policy specification is guarded and closed.

An embodiment may further provide a long analyzer where the one or more processors are further configured to predetermine a set of groupings based on the policy specification and event classification, the set of groupings identifying the groups used when grouping each of the received events. In this embodiment, the set of groupings may be predetermined based upon transforming the event classification with respect to guards of the policy specification.

As a person of ordinary skill in the art would readily apprehend, all features of the present invention can be used alone or combined in different combinations in embodiments of the invention.

Figure 1:
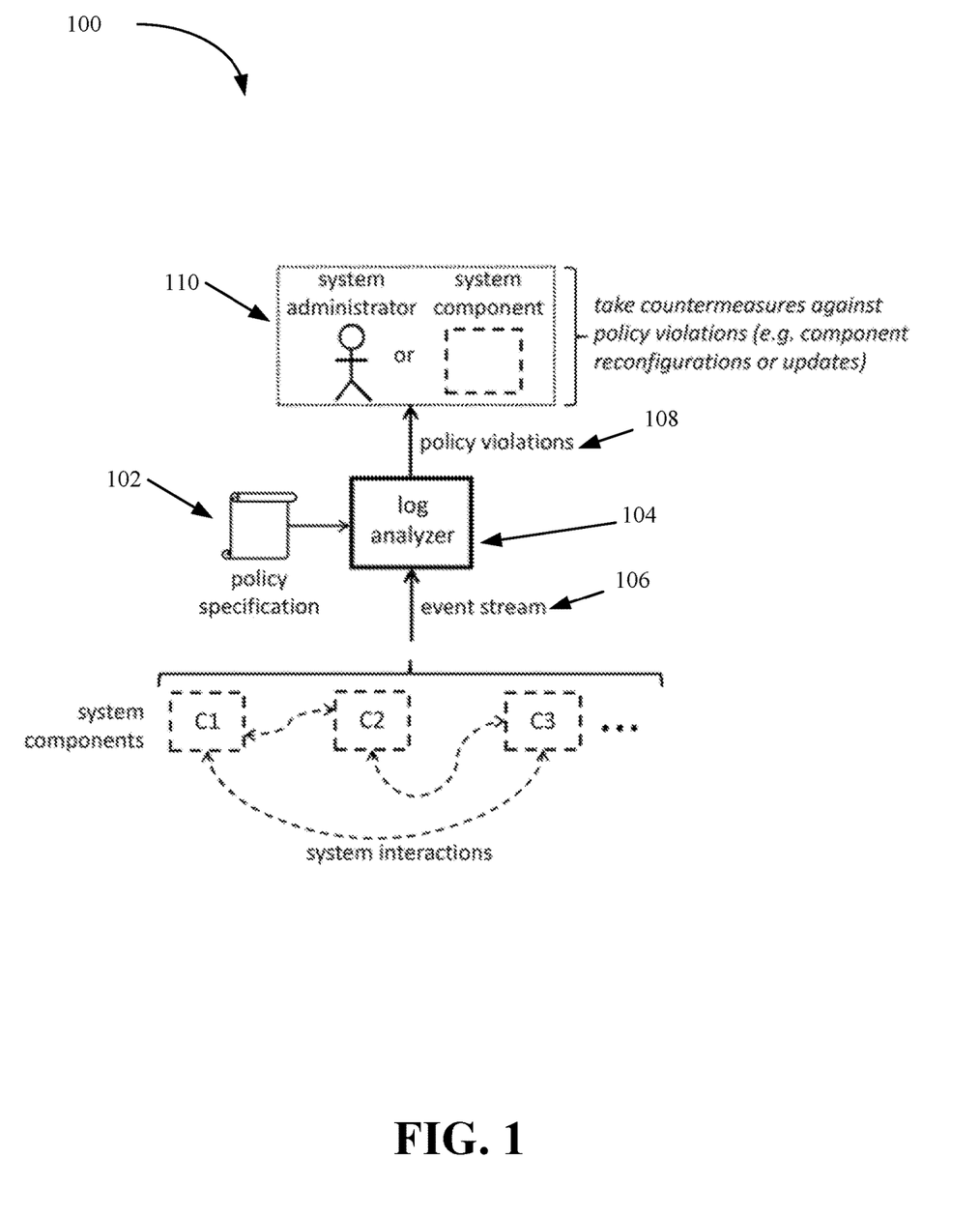
FIG. 1 illustrates a system utilizing a log analyzer, according to an embodiment of the invention.

FIG. 1 illustrates a system 100 implementing a log analyzer 104 according to an embodiment of the invention. The system 100 includes a plurality of system components (C1, C2, C3, . . . ) that interact with each other, for example, over asynchronous channels. Each of the system components (C1, C2, C3, . . . ) logs actions it performs. Examples of such actions are: opening or closing of a file or socket, or approval of a request of accessing a document; but many more actions are possible, as is known by those skilled in the relevant art.

The logged actions—which are events according to embodiments of the invention—are collected and sent to the log analyzer 104 as an event stream 106. The event stream 106 is then analyzed by the log analyzer 104 using one or more policy specifications 102. Embodiments of the present invention may use SIEM tools to provide frameworks for event logging and streaming (as examples) and special engines for correlating events from different system components.

The output of the log analyzer 104, which includes policy violations 108, can be forwarded to a system administrator (or another system component) 110 that takes appropriate actions in case of identifying noncompliant or malicious behavior. For example, the administrator 110 can terminate or reconfigure system components (C1, C2, C3, . . . ) based on the identified noncompliant or malicious behavior.

System components (C1, C2, C3, . . . ) can reside on one server or computing device or can be distributed between multiple servers or computing devices. Servers and computing devices include one or more processors, memories, and/or network interfaces.

Figure 2:
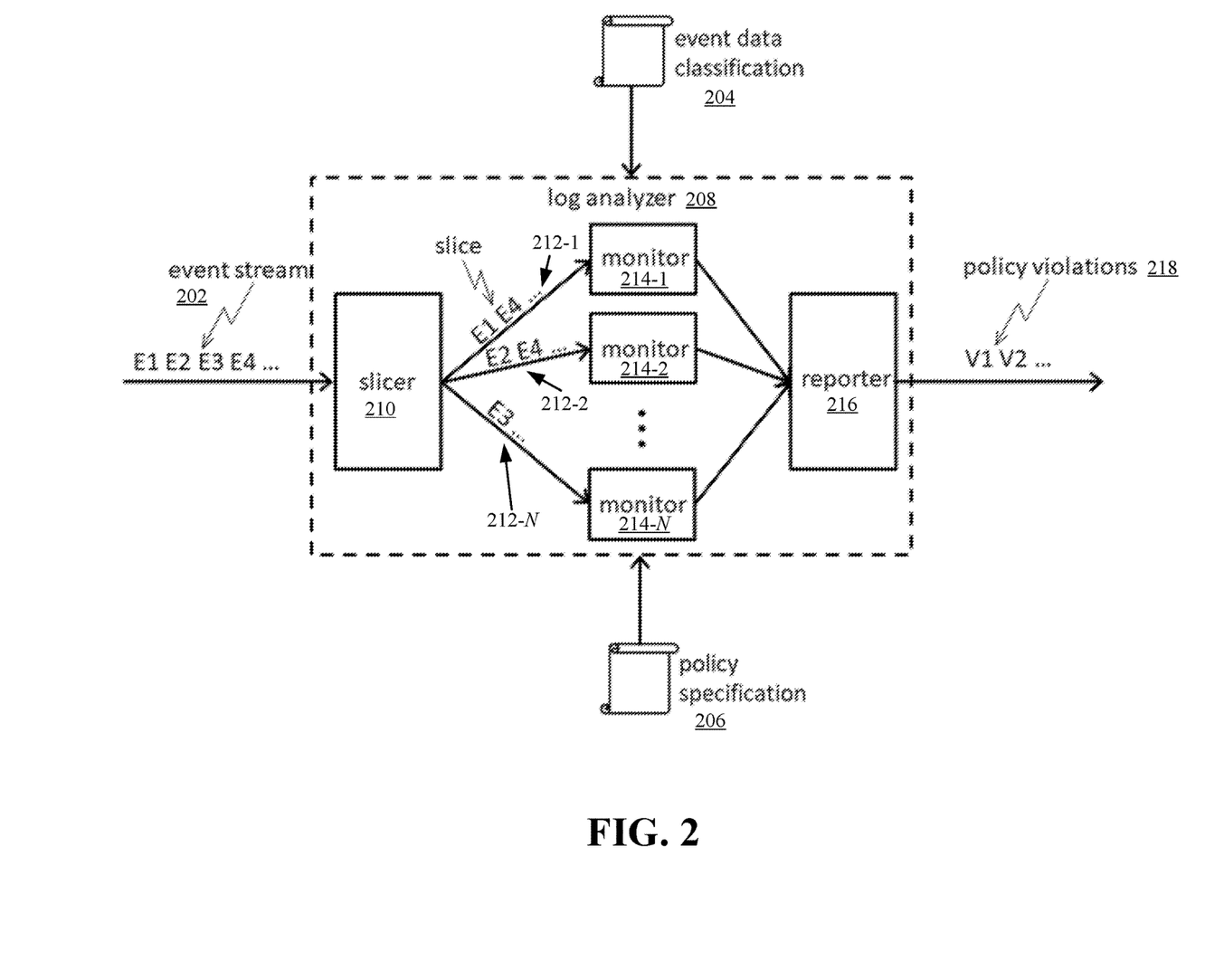
FIG. 2 illustrates a log analyzer, according to an embodiment of the invention.

FIG. 2 illustrates a log analyzer 208 for parallelizing and distributing analysis of a stream of logged system events (event stream 202), according to an embodiment of the invention. The log analyzer 208 includes a slicer 210, one or more monitors 214, and a reporter 216. The slicer 210 groups events in the event stream 202 into slices 212, the monitors 214 analyze the individual slices 212, and the reporter 216 receives analysis results from the monitors 214 and outputs the policy violations 218.

The log analyzer 208 groups incoming events in an event stream 202 into slices 212. The slices 212 are substreams of the incoming event stream 202. The log analyzer 208 performs slicing of the incoming event stream 202, based on a given policy specification 206 and an event classification 204, including data values that the events carry. The slicing can be performed either online or offline. In some embodiments, an event is assigned to multiple slices 212. The events of each slice 212 are further processed, that is, each slice 212 is individually checked online against the given policy specification 206. Since the event slicing is property preserving, a policy violation on a slice 212 corresponds to a violation on the stream of logged system events (event stream 202), and vice versa.

An advantage of the present invention is that it supports an efficient and scalable implementation (e.g., using distribution and parallelization). The method provides advantages to improvement of computer networks. For example, in the advent of Internet of Things (IoT) platforms, multiple IoT devices will wirelessly communicate with one another, presenting a challenge in secure/error-free communication in crowded a crowded network space. Embodiments of the present invention allow a network/system administrator to monitor and identify patterns in networked interactions for discrete IoT platforms, allowing prompt intervention when error patterns, noncompliant, or malicious behaviors are detected. Embodiments not only improve IoT platforms, but can also improve security in security operations centers (SOCs).

In embodiments, monitors check properties on event streams in real-time. Parallelizing the monitoring process (e.g., on multiple computation nodes) can achieve a throughput that enables real-time monitoring. Furthermore, a slicing criterion of the events in the stream can be configurable and, depending on the policy specification language, the slicing criterion can be automatically computed from a given policy.

A brief discussion of operation of a log analyzer and its components follows. An event describes an action or observation of a system component. As mentioned previously, examples of events include the opening of a file or the request of accessing a document, but are not so limited. Events in an IT system are often logged. The logged information about an event is system dependent. The logged information may include a source of the event, a timestamp when the event occurred, and a description of the event. For example, the logged event of opening a file can be of the form:

1529917355|127.0.0.1|OPEN_FILE(confidential.txt)

where the first column is event's timestamp in Unix time, the second column is the component that carried out the event, and the third column is the description of the event and the involved data items. In the example above, the "event" is the line entry, which would appear, e.g., as an entry in an event stream. An event's "description" relates to the portion of the line entry that describes the event (here, "OPEN_FILE (confidential.txt)"). The event's name (or type) is a value in the event description (here, "OPEN_FILE"). This particular event also has an associated register that has a data value (here the register is "FILENAME" and the data value is the text string of the file name). Thus, the above event is opening the file confidential.txt, which took place at (Unix) time 1529917355, and was carried out by the system component identified by 127.0.0.1.

Events can be encrypted and may be signed for security reasons. Furthermore, dedicated protocols and interfaces like Unix syslog and Google's Protocol Buffers exist for efficiently exchanging events (e.g., via transmitting a description of events to a log server or a log analyzer).

A policy describes how a system and its components, e.g., the system including system components (C1, C2, C3, . . . ) in FIG. 1, should and should not behave. In an example, a policy can state that a server is only allowed to access files classified as confidential when the most recent security patches have been previously installed. Building blocks of a policy include events, and examples of events include accessing a confidential file and installing a security patch. Furthermore, policies correlate events and data values within the events with each other in a temporal dimension. For example, an event of installing a security patch is temporally related to accessing a confidential file by the example policy stated above.

Although the example policy above is described in words, different formalisms exist for specifying policies. For example, policies can be specified using a logic-based formalism. In an embodiment, policies are given as formulas of real-time logic MTL (Metric Temporal Logic) extended with a freeze quantifier (for a discussion of MTL, see Alur and Henzinger, "Logics and models of real time: A survey," in Proceedings of the Real-Time: Theory in Practice, REX Workshop 6:1991, pp. 47-106 (1992), the entire contents of which is hereby incorporated by reference herein). The core syntax of the policy specification language of an embodiment of the present invention is given by the grammar:

spec::=TRUE|$p(x_1, \ldots, x_n)$|FREEZE[$r$]$x$. spec|NOT spec|spec OR spec|spec SINCEI spec|spec UNTILI spec, where p ranges over the predicate symbols (which describe events or properties of events or properties of data values), x ranges over the variables names, and r over the registers. Furthermore, I specifies a relative time period. As used above, spec is a nonterminal of a BNF (Backus-Naur Form) grammar. Predicate symbols, e.g., access or request, correspond to events (see below). Predicate symbols can also be standard arithmetic predicates with a rigid interpretation over time, e.g., = and ≤. An extension with arithmetic terms that are built from constants, variables, and standard arithmetic operators, e.g., +, can be added. As used herein, a register specifies the source from which a data value is taken, and a variable is instantiated with this value.

Basin et al., "Runtime Verification of Temporal Properties Over Out-of-Order Streams" (CAV) 2017 ("Basin"), the entirety of which is hereby incorporated by reference herein, provides details about an example policy specification language, including the logic's semantics, that can be used by embodiments of the invention. An example is provided herein for intuitive explanation of syntax. In the example, the formula p UNTIL(0,3] q is true at time t if p is true at any time from t onwards until q is true (here the unit of time is seconds). In addition, a point time s where q is true must satisfy a metric constraint, provided by the interval (0,3], relative to the time t, i.e., q must be true within 0 and 3 seconds, where 0 is excluded and 3 included. Note that p and q can be arbitrary formulas.

In an embodiment, standard syntactic sugar is used in policy specification. For instance, p AND q abbreviates NOT ((NOT p) OR (NOT q)), p IMPLIES q abbreviates (NOT p) OR q, EVENTUALLY p abbreviates TRUE UNTIL p, and ALWAYS p abbreviates NOT EVENTUALLY NOT p, where the interval [0, ∞) of the temporal connective is omitted. The syntactic sugar of the corresponding past-time temporal connectives ONCE and HISTORICALLY is analogous. For readability, registers of the FREEZE quantifiers are left implicit, since they can be irrelevant for the exposition from which exact registers data values of an event are taken.

A formula is in negation normal form if negation (i.e., the Boolean connective NOT) only occurs directly in front of atomic formulas. A logically-equivalent negation normal form of a formula can be obtained by eliminating double negations and by pushing negations inwards, where we consider the Boolean connective AND and the dual temporal connectives TRIGGERI and RELEASEI as primitives. Negation can be pushed over the FREEZE quantifier. Recall that p RELEASEI q is defined as NOT ((NOT p) UNTILI (NOT q)). The definition of TRIGGERI is analogous.

As an example, reconsider the policy about a server accessing confidential files. It can be formalized by the following formula:

ALWAYS FREEZE agent, file, flag.
   access(agent, file, flag) AND flag≥confidential|server
   IMPLIES
   ((NOT patch) SINCE patched(agent)) OR HISTORICALLY NOT patch Each event includes a timestamp and an event description. From the parts of the event, the register values and the interpretation of the predicate symbols, that is, the interpretation of a time point with the event's timestamp, can be obtained. For example, if the event has the form:

1529917355|127.0.0.1|OPEN_FILE(confidential.txt)

interpretation of the predicate symbol access at (Unix) time 1529917355 is the singleton set consisting of the triple ("127.0.0.1", "confidential.txt", 3), where bit 0 is a confidential flag and bit 1 is a server flag (i.e., {server flag, confidential flag}={1,1} converts to an integer 3). Furthermore, the registers at (Unix) time 1529917355 are the strings "127.0.0.1" and "confidential.txt", and the integer 3. The interpretation of events is system dependent. As such, a system administrator or some other system component should provide such a mapping.

Thus, the interpretation of the predicate symbol is determined by the event. To this end, embodiments provide a function that enables mapping events to the interpretation of the predicate symbols. For example, a system administrator can provide a specification which defines how events map to the interpretation of predicate symbols. Using the above example, the system administrator would have defined a specification that maps the above event long entry to the access predicate symbol.

Variants and extensions exist, e.g., metric first-order temporal logic (MFOTL). For more detail, see Basin et al., "Monitoring Metric First-order Properties" (ACM) 2015 ("Basin II"), and Basin et al., "Scalable Offline Monitoring of Temporal Specifications" Formal Methods in System Design 2016 ("Basin III"), the entire contents of both of which are hereby incorporated by reference herein in their entirety. Furthermore, other policy specification languages can be used, for example, formalisms that are based on finite-state machines or regular expressions and extensions thereof, to deal with data values. Therefore, slicing event streams according to embodiments of the invention can be performed using policies described in these policy specification languages.

Events may either be stored in log files for a later offline analysis or analyzed online. Descriptions below focus on online analysis for checking policy compliance on a single event stream. Although not provided as an example, offline analysis is similar, and providing online monitoring and analysis does not limit the scope of the disclosure.

A preprocessing step when processing a next element in an event stream, e.g., when a log analyzer receives an event message, is to identify the event and its data values. Afterwards, the extracted information is provided to a single monitor that computes how the event is correlated with other events. Whenever a given policy specification is violated (or satisfied) the monitor outputs a verdict. The step of determining the correlation between events can be computationally intensive. For instance, in the example about limiting access to confidential events, a monitor correlates access events with events about security patches, in particular, whether security patches are available and whether they have been installed on a server. Basin and Basin II, for instance, describe such event correlation engines on a single event stream. However, many events are usually not correlated at all, and processing all events by a single monitor is often an efficiency bottleneck.

Embodiments of the invention group events of an event stream into multiple substreams in a process called slicing. An event can be present, however, in multiple substreams. Slicing, in embodiments, is property preserving, which means that monitoring the substreams results in detecting the same policy violations as monitoring the single event stream. Furthermore, embodiments enable slicing that is fast and local. Fast refers here to the time needed to determine the slices of the event. To be fast, the decision must be made in a fraction of a few milliseconds for each event. Local means here that the slices can be determined by only looking at the event itself and not also other events that, e.g., have been received previously. In other words, the decision making is stateless, which can help make decisions fast because, e.g., there is no state update and less memory is used. Thus, fast and local means that the decision for putting an event in a particular substream or set of substreams is performed quickly and is made by only viewing the specific event.

The resulting substreams generated by slicers of embodiments are also small, which allows for performance gains resulting from parallel monitoring to be maintained. Small means that each slice is substantially smaller than the overall stream. There is generally a tradeoff between fast, local and small. For example, sending each event to all slices, is fast and local, but is not small and thus does not improve monitoring.

To assist in illustrating advantages offered by the present invention, reconsider again the policy of accessing confidential files, together with its formalization. A simplistic method for checking compliance of this confidential access policy could be to perform the check for each server separately. In fact, the event stream handling methods by Rosu et al., "Semantics and Algorithms for Parametric Monitoring" (Logical Methods in Computer Science) 2012 ("Rosu"), U.S. Pat. No. 8,719,796 to Rosu et al. ("Rosu II")—both of which are hereby incorporated by reference herein in their entirety, and Basin II, essentially perform this simplistic method by generating substreams for different data values for agent. In an extreme case, one slice is obtained for each such value. Each of these substreams contains the respective access and patched events. The patch events are contained in every substream. As such, the generated grouping is property preserving. Furthermore, since patch events will most likely occur rarely, relative to the number of access events, each resulting substream will be substantially smaller than the original stream and thus simpler (i.e., more efficient) to monitor.

As used above, a patched event represents where a patch has taken place, e.g., "Agent X is patched by the most recent software patch." A patch event, on the other hand, represent where a patch is available. Thus, a patched event will have an additional parameter over a patch event, e.g., Agent X, as used in the above example. An agent may be a system component that is logging its actions in a system, and a data value for an agent can include an IP address or some other identifier. For further illustration, consider an event of the form:

TIMESTAMP|AGENT|INSTALLED THE MOST RECENT PATCH

The interpretation of the predicate symbol at time TIMESTAMP would be the singleton set {AGENT}. Furthermore, the corresponding register at time TIMESTAMP would carry the value AGENT. And the event description corresponds to a patched event.

For an illustration of how existing event stream handling methods fall short of the improvements provided by embodiments, consider the following policy specification:

ALWAYS FREEZE agent, token.consume(agent, token)
  IMPLIES
  EVENTUALLY[0,5s]FREEZE agent', token'.request
    (agent', token') AND
    token'=token+1

The example policy specification dictates that after consuming a token (by some agent), the next token should be requested (by some agent) within 5 seconds. However, the event stream handling scheme of Rosu and Rosu II has no effect here because the policy specification requires that data values of events are compared, which is not a case handled by Rosu or Rosu II. The slicing in Basin II is also ineffective (as compared to the present invention) because Basin II's resulting substreams do not contain significantly less elements than handling the event stream without creating substreams; thus no efficiencies are gained.

The inventors have recognized, however, that the event stream can still be sliced into substreams that are more computationally efficient to monitor as compared to, for instance that of Rosu, Rosu II, or Basin II. For example, the event stream can be sliced into substreams that: (1) contain consume events with tokens ranging from c to c+s; and (2) contain request events with tokens ranging from c+1 to c+s+1. The parameter c represents a starting point for the token range. The parameter s provides some control over size of the substreams. In some embodiments, token numbers most likely appear in sequence. To obtain a more equal distribution of events for a time period, the token numbers can be partitioned into the sets $D_0, \ldots, D_{m-1}$, for example, by using a hash function (e.g., the Murmur Hash function). Then, consume events with tokens in $D_i$ and request events with tokens in $D_i+1$ end up in the same substream i. The sets $D_0+1, \ldots, D_{m-1}+1$ can be precomputed from the partition $D_0, \ldots, D_{m-1}$. In an embodiment, when precomputing these sets, only set-membership checks need to be performed to determine to which slices an event belongs to.

In embodiments, for setting up the slicing, a classification of the events and data values is provided. Additionally, the policy specification is guarded.

Event classification assumes a grouping of events in the data stream, including data values of the events. The grouping can be overlapping, i.e., the grouping does not need to be a partition. However, every event is contained in at least one group.

A formula without temporal connectives and FREEZE quantifiers is a state formula. A formula is guarded if (a) it is in negation normal form and (b) all its sub-formulas with a temporal connective as its main connective are of one of the four forms:
(FREEZE[r̄]x̄.g IMPLIES p) SINCEI (FREEZE[s̄]ȳ.h AND q),
(FREEZE[ē]x̄.g IMPLIES p) UNTILI (FREEZE[s̄]ȳ.h AND q),
(FREEZE[r̄]x̄.g AND p) TRIGGERI (FREEZE[s̄]ȳ.h IMPLIES q), or
(FREEZE[r̄]x̄.g AND p) RELEASEI (FREEZE[s̄]ȳ.h IMPLIES q),
where I is an interval, g and h are state formulas, and p and q are formulas.

Further constraints include: (1) the outermost connective of the policy specification is a temporal connective; and (2) the policy specification is closed, that is, it does not contain free variables. Without loss of generality, a slicer operates in a manner that each variable occurring in the policy specification is bound only once by one of the policy specification's FREEZE quantifiers. The FREEZE quantifier of a guard freezes the variables to the data values of the register of a time point. A guard imposes constraints on an event. These constraints may refer to data values from other events, relating them to data values of the current event. Furthermore, guards can be the formula TRUE, which imposes no constraints on an event.

For an illustration, reconsider the policy specification:
ALWAYS FREEZE agent, token. consume(agent,token) IMPLIES
EVENTUALLY[0,5s] FREEZE agent', token'. request (agent', token') AND
token'=token+1.
Guards of the policy specification are $g_1$=consume(agent, token) and $g_2$=request(agent', token') AND token'=token+1. In this case, the guard $g_2$ imposes a constraint on data values from different events, namely, the event of the current time point and the one of the event from the guard $g_1$.

Figure 3:
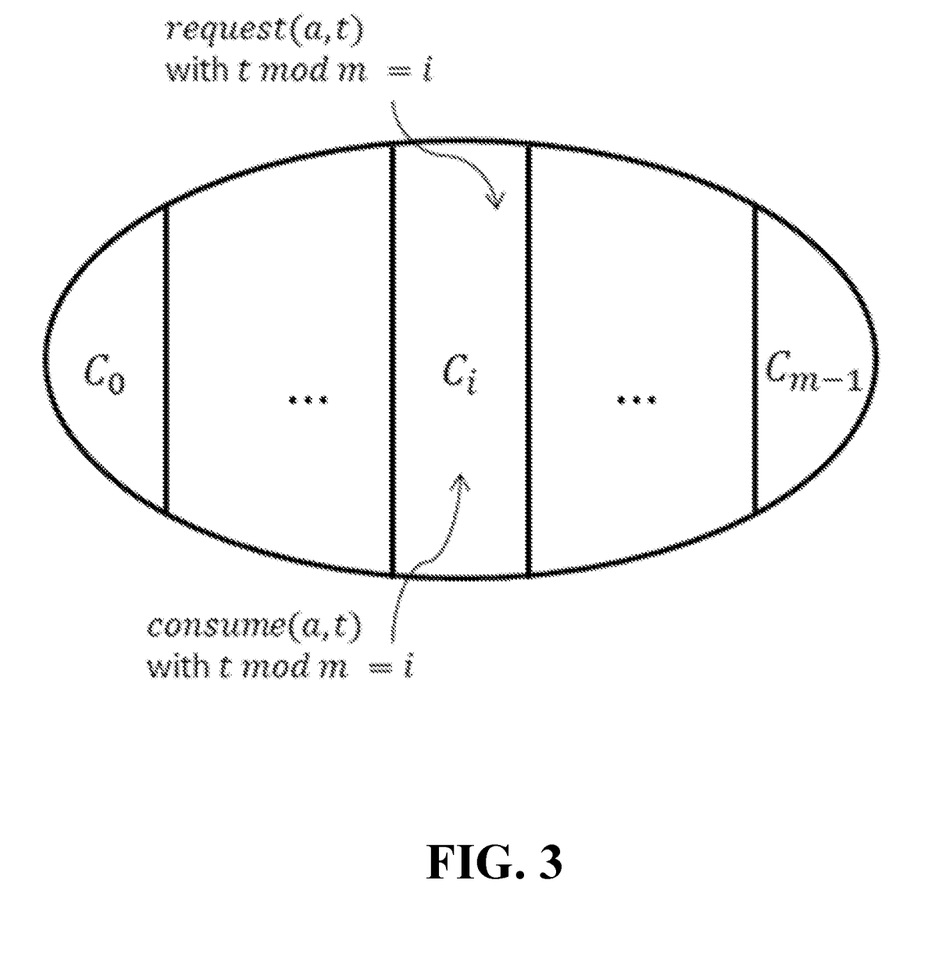
FIG. 3 illustrates event classification, according to an embodiment of the invention.

FIG. 3 illustrates event classification according to an embodiment of the invention. For m≥1, an event classification is, for example, given by the sets $C_i$={ev(a,t) |ev∈{consume, request}, a∈|ℕ|, and t mod m=i}, for i∈ {0, . . . m−1}. In this notation, events are given as ev(a, t), where ev indicates type of event (e.g., a consume or a request), and a and t are data values associated with the event, ranging over nonnegative integers. An event ev(a, t) determines interpretation of the predicate symbol ev and register values at a time point, namely, the singleton set {(a, t)} and a, t, respectively. Furthermore, if ev=consume then the interpretation of the predicate symbol request is the empty set, and if ev=request, then the interpretation of the predicate symbol consume is the empty set.

In an embodiment, let S be a policy specification and $C_0, \ldots, C_{m-1}$ an event classification, as shown in FIG. 3. Furthermore, let $g_1, \ldots g_n$ be the guards of the policy specification S. The guards can be partially ordered with respect to the formula structure of the policy specification. That is, a partial order with $g_i \prec g_j$ if $g_j$ is a sub-formula of the formula that $g_i$ guards; otherwise, $g_i$ and $g_j$ are incomparable. In particular, variables in $g_i$ are either bound by the guard's FREEZE quantifier or belong to a guard $g_j$ with j≺i.

From the given event classification $C_0, \ldots, C_{m-1}$ and for each guard $g_i$, the sets $C_{i0}, \ldots, C_{i(m-1)}$ are iteratively defined, where i ranges from 1 to n. The base case i=1 is as follows.

$C_{1j}$={ev(d̄)∈$C_j$|ev(d̄) satisfies the guard $g_1$}
for j∈{0, . . . , m−1} where, ev(d̄) denotes an event and data values of the event is identified with d̄. d̄ determines, e.g., register values at a time point and to which the variables of a guard are frozen to.

The step case for i>1 is as follows.

$C_{ij}$={ev(d̄)|ev(d̄) satisfies ∃$ev_1$(d̄$_1$)∈$C_{1j'}$ . . .
∃$ev_{i-1}$(d̄$_{i-1}$)∈$C_{(i-1)j'g_i}$} for j∈{0, . . . , m−1}

Figure 4:
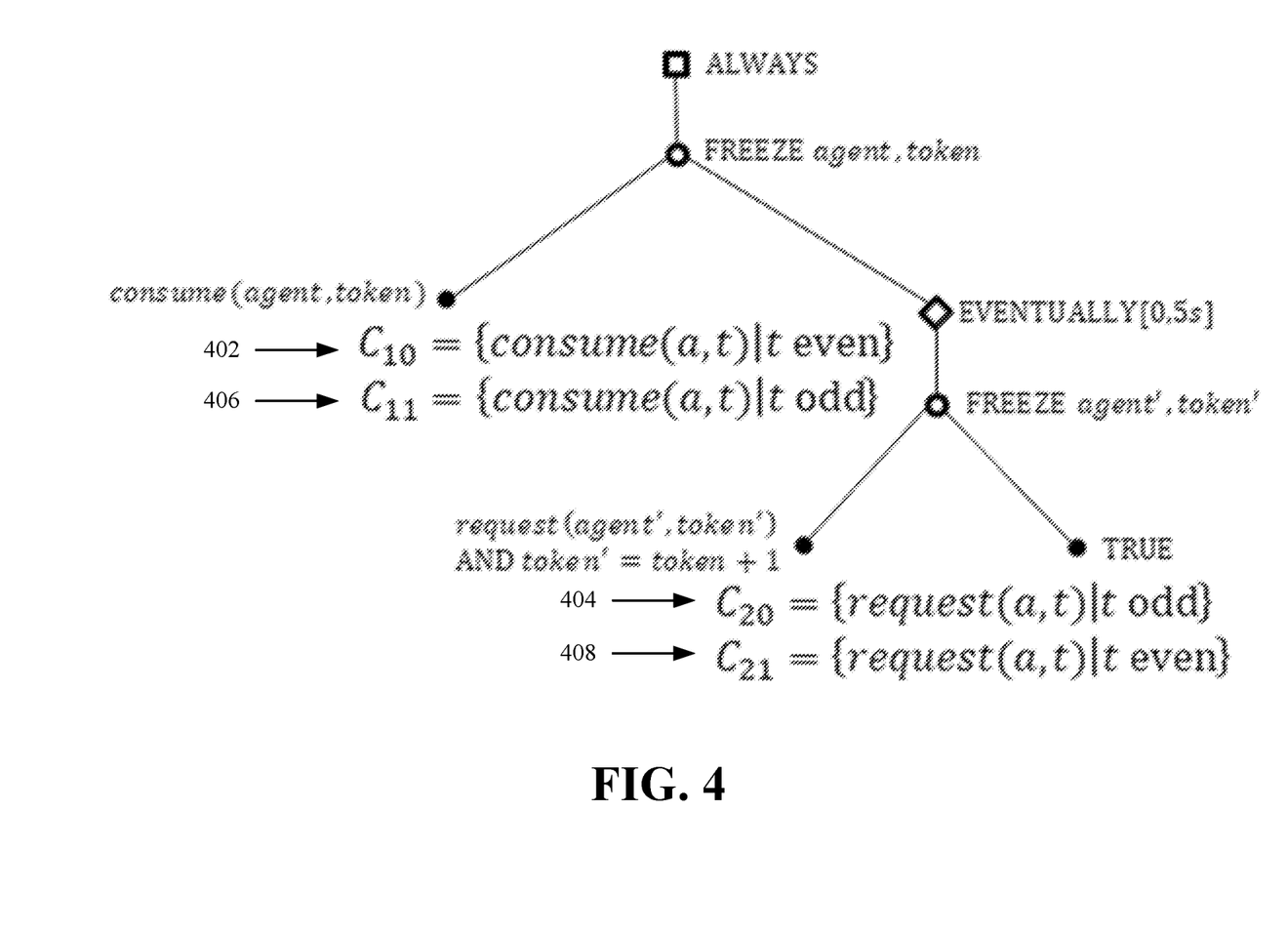
FIG. 4 illustrates event classification in two groups, each group containing two sets, according to an embodiment of the invention.

The given event classification is transformed with respect to the guards of the policy specification. FIG. 4 illustrates an example where m=2, according to an embodiment of the invention. For example, using FIG. 4, an event request(0,3) is classified in $C_{20}$ because the guard request(agent', token') AND token'=token+1 is satisfiable for some event in $C_{10}$, that is, any event consume(a, 2) with a∈ℕ. The variable token' is frozen to the data value 3 (originating from the event request(0,3)), and the variable token is frozen to the data value 2 (originating from the event consume(a, 2)).

For each j∈{0, . . . m−1}, let $S_j$ be the set $S_j = \cup_{i=1}^n C_{ij}$. With the constructed sets $S_0, \ldots, S_{m-1}$ at hand, obtained from the policy specification and the event classification $C_0, \ldots, C_{m-1}$, events for each substream can be determined: whenever an event is in the set $S_j$, then the event is assigned to the jth substream.

For the running example, two substreams are obtained when m=2. The substream 0 includes the events consume (a, t) and request(a', t') with a, a', t, t'∈ℕ, t being even, and t' being odd. The substream 1 includes events consume(a, t) and request(a', t') with a, a', t, t'∈ℕ, t being odd, and t' being even. Both substreams can be monitored independently from each other. That is, item 402 and 404 specify one grouping and item 406 and 408 specify another grouping.

An intuitive reason why slicing, according to embodiments of the invention, is property preserving and the substreams can be monitored independently from each other is that an event that does not satisfy a guard is irrelevant for satisfaction of the temporal property. For instance, for EVENTUALLY I FREEZE x̄.g AND p, when the event does not satisfy g, then the event is trivially not a witness that p becomes eventually true within the time bound I. The event can therefore be safely ignored.

According to an embodiment, when a policy specification is constrained such that it capable of being checked only on a single event stream (e.g., not "parallelizable"), the slicer is configured to send the non-parallelizable events to all monitoring instances.

A slicer in a log analyzer according to embodiments of the invention can have various properties. Firstly, slices for an event stream can be determined by set membership. Set membership checks can be hardcoded into the slicer for a given policy specification and a given event classification. Set membership checks can also be performed using general off-the-shelf satisfiability modulo theories (SMT) solvers like Z3 by Microsoft Research, Yices by SRI International or MathSAT by FBK. Using general off-the-shelf SMT solvers has the benefit that policy changes are automatically accounted for by reconfiguring input to the SMT solvers. However, the used SMT solver should support the background logical theories of the state formulas.

Secondly, the slicer in a log analyzer according to embodiments of the invention can run multiple set-membership checks in parallel to increase throughput of the slicer. In case the order of events is relevant for monitors in the log analyzer, the slicer may utilize buffers to buffer events before forwarding them to a monitor.

Thirdly, the slicer in a log analyzer according to embodiments of the invention can encounter an event that occurs in none of the sets. If this is the case, the event can be dropped by the slicer. The slicer can also encounter events that occur in multiple sets. In this case, the event is forwarded by the slicer component to multiple monitors.

Embodiments of the invention provide advantages over conventional stream processing engines that process events in parallel. Conventional stream processing engines only handle trivial cases when assigning an event to a monitor (see e.g., U.S. Pat. Nos. 9,244,978 and 9,805,101, the entire contents of each of which are hereby incorporated by reference herein). Trivial cases include grouping all events with an attribute with a certain value or all events from the same source, user, or session identifier. Conventional methods assume that the grouping is given and does not have a capability to determine or obtain a property-preserving grouping of the events.

Embodiments of the disclosure provide a property-preserving pipeline that slices event streams online. The slices are checked individually against a policy specification on multiple computation nodes in parallel. The pipeline takes advantage of a transformation of a given event classification, including the data values within events, determined by constraints extracted from the policy specification that guard requirements on the (temporal) correlations between events. The pipeline also takes advantage of assignment of the events to the slices through the transformed classification.

Figure 5:
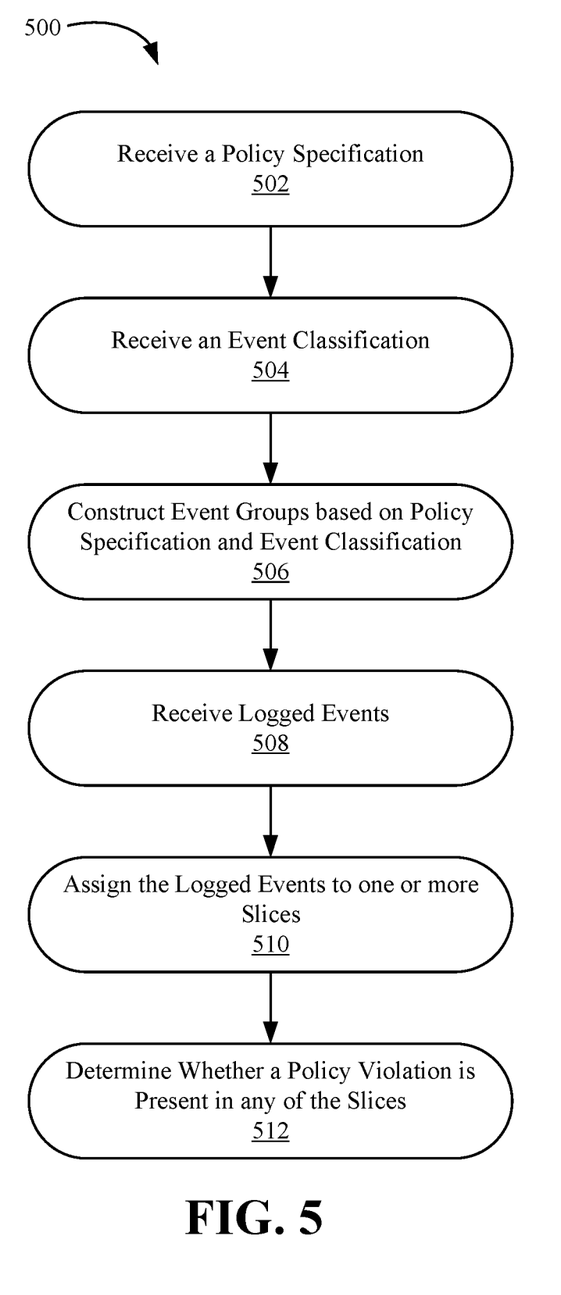
FIG. 5 is a flow diagram illustrating a process for detecting patterns in an event stream, according to an embodiment of the invention.

FIG. 5 is a flow diagram illustrating a process 500 for analyzing an event stream that includes one or more logged events for incorrect behavior, according to an embodiment of the invention. The process 500 may be performed by a log analyzer, e.g., log analyzer 208. At operation 502, the log analyzer 208 receives a policy specification 206.

At operation 504, the log analyzer 208 receives an event classification 204. The policy specification 206 and event classification 204 may be provided by a network or system administrator (e.g., system administrator 110).

At operation 506, the log analyzer 208 constructs one or more event groups based on the policy specification 206 and the event data classification 204.

At operation 508, the log analyzer 208 receives one or more logged events (e.g., E1, E2, E3, E4 . . . ) as the event stream 202. A timestamp can be included in each of the logged events. The event stream 202 may be received from a plurality of system components (C1, C2, C3 . . . ) of the system 100.

At operation 510, the log analyzer 208 analyzes each received event in the one or more logged events to assign each received event to one or more slices (e.g., slices 212-1, 212-2 . . . 212-N). In an embodiment, the slicer 210 of the log analyzer 208 performs this operation. The grouping of each received event into slices is performed based on the one or more event groups constructed at step 506. Received events that do not fit into any of the event groups (e.g., irrelevant for the policy) are dropped.

At operation 512, the log analyzer 208 checks each slice individually against the policy specification 206 to determine whether there is a policy violation. In an embodiment, a plurality of monitors (214-1, 214-2 . . . 214-N), each corresponding to a respective one of the slices (212-1, 212-2 . . . 212-N), performs the plurality of individual policy checks and outputs their results to a reporter 216. Policy violations detected are forwarded (e.g., by the reporter 216 of the log analyzer 208) to the system administrator 110 to be resolved.

Figure 6:
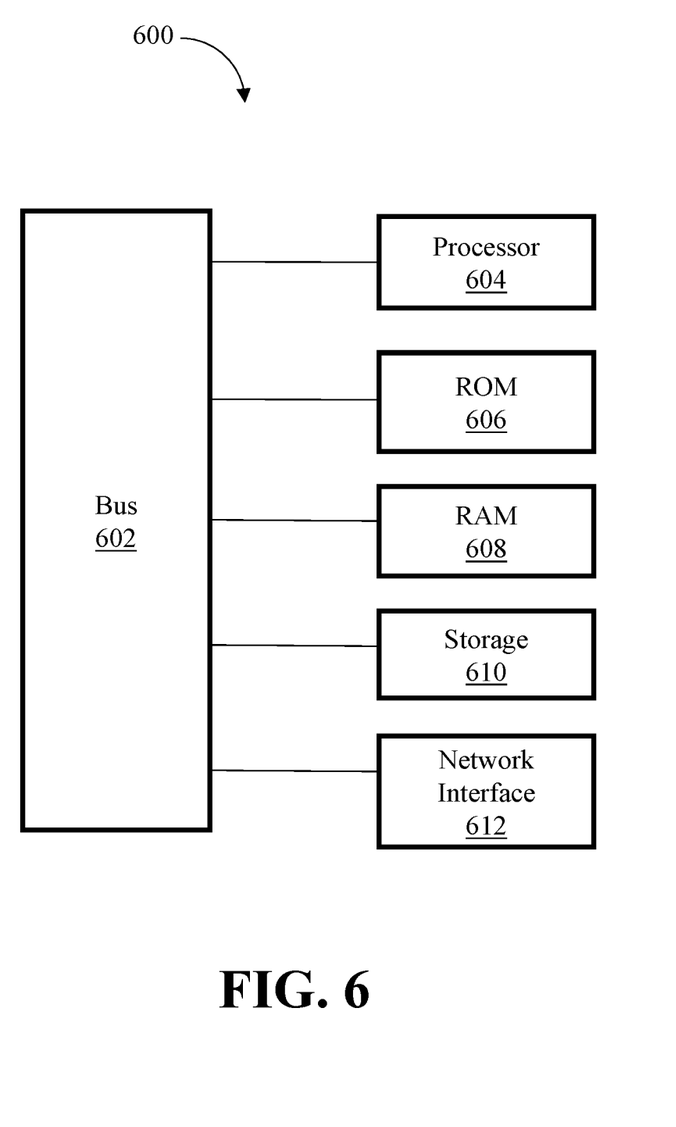
FIG. 6 is a block diagram of a processing system according to an embodiment.

FIG. 6 is a block diagram of a processing system according to one embodiment. The processing system 600 can be used to implement the protocols, devices, mechanism, systems and methods described above. The processing system 600 includes a processor 604, such as a central processing unit (CPU) of the computing device or a distributed processor system. The processor 604 executes computer executable instructions comprising embodiments of the system for performing the functions and methods described above. In embodiments, the computer executable instructions are locally stored and accessed from a non-transitory computer readable medium, such as storage 610, which may be a hard drive or flash drive. Read Only Memory (ROM) 606 includes computer executable instructions for initializing the processor 604, while the random-access memory (RAM) 608 is the main memory for loading and processing instructions executed by the processor 604. The network interface 612 may connect to a wired network or cellular network and to a local area network or wide area network, such as the Internet.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for checking policy compliance of events of an event stream, the method comprising:
receiving the events;
grouping a plurality of the received events into a plurality of slices based upon a policy specification and an event classification;
determining whether a policy violation has occurred by concurrently evaluating at least two of the slices according to the policy specification; and
in a case in which the policy violation is determined, reporting the policy violation,
wherein the grouping includes transforming the event classification, including data values with the received events, determined by constraints extracted from the policy specification and guard requirements on correlations between the received events,
wherein the policy specification is guarded and closed, and
wherein the policy specification comprises one or more policies that are specified as a formal specification language based on temporal logic with quantifiers.

2. The method according to claim 1, wherein the formal specification language is a real-time metric temporal logic (MTL) extended with a freeze quantifier.

3. The method of claim 1, wherein the event classification comprises a set of event classifications based on event types and event values.

4. The method of claim 1, wherein a size of the slices is configurable according to an adjustable parameter.

5. The method of claim 1, further comprising predetermining a set of groupings based on the policy specification and the event classification, the set of groupings identifying the groups used when grouping each of the received events.

6. The method of claim 5, wherein the set of groupings are configured to be policy preserving.

7. The method of claim 5, wherein the set of groupings is predetermined based upon transforming the event classification with respect to guards of the policy specification.

8. The method according to claim 1, further comprising initiating a counter-measure for at least one component, which is associated with an event of the event stream and is determined to have contributed to the reported policy violation, wherein the counter-measure includes at least one of restarting, terminating, or quarantining the at least one component.

9. The method according to claim 1, further comprising determining not to group an event of the event stream based upon the event being irrelevant to the policy specification.

10. A log analyzer for determining incorrect behavior of components in an information technology system, the log analyzer comprising one or more hardware processors, which alone or together, are configured to provide for execution of the following operations:
receiving a plurality of events from the components;
grouping a plurality of the received events into a plurality of slices based upon a policy specification and an event classification;
determining whether a policy violation has occurred by concurrently evaluating at least two of the slices according to the policy specification; and
in a case in which the policy violation is determined, reporting the policy violation,
wherein the grouping includes transforming the event classification, including data values with the received events, determined by constraints extracted from the policy specification and guard requirements on correlations between the received events,
wherein the policy specification is guarded and closed, and
wherein the policy specification comprises one or more policies that are specified as a formal specification language based on temporal logic with quantifiers.

11. The log analyzer according to claim 10, wherein the one or more processors are further configured to predetermine a set of groupings based on the policy specification and event classification, the set of groupings identifying the groups used when grouping each of the received events.

12. The log analyzer according to claim 11, wherein the set of groupings is predetermined based upon transforming the event classification with respect to guards of the policy specification.

* * * * *